United States Patent [19]
Scott

[11] 4,331,242
[45] May 25, 1982

[54] RECORD STORAGE SYSTEM

[76] Inventor: James W. Scott, 2491 Truman Ave., Oakland, Calif. 94605

[21] Appl. No.: 162,116

[22] Filed: Jun. 23, 1980

[51] Int. Cl.³ .................................... A47B 81/06
[52] U.S. Cl. ............................ 211/40; 312/14; 312/266; 312/329; 312/9; 206/387; 211/96
[58] Field of Search .............. 312/8, 9, 10, 14, 329, 312/300, 266, 247; 206/387; 211/40, 96

[56] References Cited

U.S. PATENT DOCUMENTS

| | | | |
|---|---|---|---|
| 853,051 | 5/1907 | Alson | 211/96 |
| 926,659 | 6/1909 | Laroussini | 312/329 |
| 1,409,392 | 3/1922 | Morgan | 211/40 |
| 1,429,339 | 9/1922 | Green | 312/14 |
| 2,076,255 | 4/1937 | Smythe, Jr. | 211/40 |
| 2,104,939 | 1/1938 | Whalen | 312/300 |
| 2,564,336 | 8/1951 | Lien | 312/9 |
| 2,583,859 | 1/1952 | Leszak et al. | 312/8 |
| 2,633,997 | 4/1953 | Johnson | 211/96 |
| 4,275,942 | 6/1981 | Steidl | 312/266 |

FOREIGN PATENT DOCUMENTS

| | | | |
|---|---|---|---|
| 2809582 | 9/1979 | Fed. Rep. of Germany | 211/96 |
| 1226682 | 2/1960 | France | 312/8 |
| 601141 | 12/1959 | Italy | 312/9 |

*Primary Examiner*—Victor N. Sakran
*Attorney, Agent, or Firm*—Alvin E. Hendricson

[57] ABSTRACT

A storage system for phonograph records and the like which may be totally enclosed has a plurality of vertically spaced double link arms with each mounting a support disc having an upright record retaining shaft thereon whereby groups of closely spaced records may be swung out for ready selection and return.

1 Claim, 3 Drawing Figures

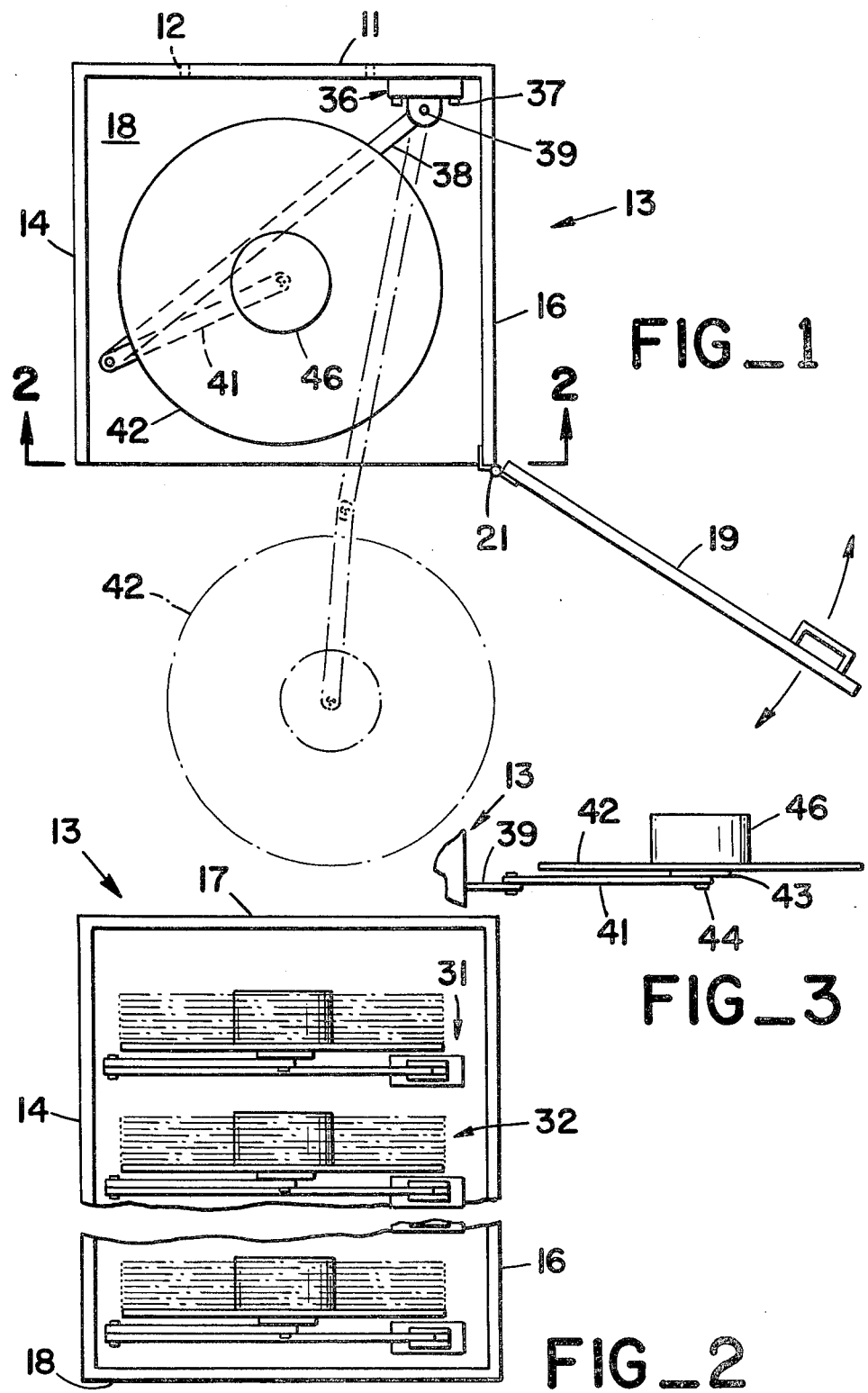

RECORD STORAGE SYSTEM

BACKGROUND OF INVENTION

Storage systems for phonograph records vary from simple boxes with cardboard spacers to complex mechanical structures adapted to be applied to a phonograph for swinging any selected record into position for playing. Early record holders are shown in U.S. Pat. Nos. 926,659, 1,409,392 and 2,076,255.

Many commonly employed phonograph record holders provide vertical record placement which is not conducive to the maintenance of a flat or planar record configuration. Also, record storage normally compromises either accessibility or storage density unless undue complexity is incorporated.

The present invention provides a multiple link mounting arrangement of closely packed groups of records for maximizing accessibility and storage capability with a minimum of mechanical complexity.

SUMMARY OF INVENTION

The record storage system of the present invention includes a housing which may be formed as a vertically elongated rectangular box having an open front that may be closed by a hinged door. Within the housing there are disposed vertically spaced record supports with each of the supports including a disc with an upright shaft for removably retaining a stack of records. Each support has a pair of links or arms pivotted together and pivotally connected between the support discs and the rear interior of the housing so that stacks of records may be swung out of the housing for use.

BRIEF DESCRIPTION OF FIGURES

The present invention is illustrated as to a single preferred embodiment in the accompanying drawing, wherein:

FIG. 1 is a plan view of the present invention with the top of the housing removed and illustrating in phantom the support means swung out of the housing;

FIG. 2 is a partial front elevational view of the system; and

FIG. 3 is a partial side elevational view of a support means swung out of the housing.

DESCRIPTION OF PREFERRED EMBODIMENT

The record storage system of the present invention, as illustrated in the accompanying drawings, includes a mounting plate 11 adapted to be secured to a wall, for example, as by screw extending through apertures 12 therein. This mounting plate may, as shown, comprise the back wall of a housing 13 including sidewalls 14 and 16 and top and bottom walls 17 and 18. The housing is shown to be rectangular in configuration with an open front that may be closed by a door 19 hinged as indicated at 21 upon a front edge of a side wall 16. Although the present invention does not require the provision of a housing that may be closed, it will be appreciated that such a housing does provide additional protection for records being stored.

Upon the mounting plate 11 there are provided a plurality of vertically spaced support means 31, 32, etc. Considering the support means 31, it will be seen that same includes a pivot-mount 36 secured as by screws or bolts 37 to the support plate 11 with a first support arm or link 38 pivotally mounted thereon as by a pivot-pin 39. At the outer end of the first support arm 38 there is provided a second support arm or link 41 which is pivotally connected to the first support arm.

The support means 31 additionally includes a disc 42 which is pivotally mounted on the outer end of the second support arm 41. Preferably a washer or the like 43 is disposed between the disc 42 and outer support arm 41 about a pivot pin 44. Upon the upper surface of the disc 42 there is provided a short shaft 46 which is coaxial with the disc and extends vertically upward therefrom. This shaft 46 is dimensioned to fit through the central axial opening of a phonograph record. If the system is designed to store 45 rpm records, the shaft 46 would then have a substantial diameter equal to the relatively large opening in 45 rpm records. On the other hand, if the system is designed to store larger diameter records, adapted to be played at different speeds and having a small central opening, the shaft would then be dimensioned to fit this small opening. The invention is equally applicable to the storage of long playing records or 78 rpm records.

The mounting means 31, 32, etc. are vertically separated on the mounting plate 11 in order to provide sufficient space for each support disc to carry ten or so records stacked thereon. The pivot arms 38 and 41 carry the support disc of each support means and provide means for moving each disc and the records carried thereby toward and away from the support plate 11. The dimensions and relative dimensions of the support arms may be varied in accordance with the particular application of the invention. In the illustrated embodiment wherein the records are adapted to be stored in a housing an swung in groups outwardly therefrom, it is necessary that the combined lengths of the support arms be sufficient to dispose the support disc exteriorly of the housing in extended position of the support means. Additionally, it is necessary for the arms to be properly dimensioned to fold or pivot to allow movement of the support disc completely into the housing. Preferably the first or rear support arm 38 is longer than the second or front support arm 41, as shown.

It will be seen from the foregoing description of the present invention that there is provided a record support system of high-density storage and simplicity of structure. The record support means are quite simple in structure and yet provide for ready access to chosen stacks of records. The housing of the present invention provides for secure and protective storage for records when not in use. Of course decorative additions may be employed as, for example, upon the exterior of the housing and front door thereof to fit the system into various decors.

Although the present invention has been described above with respect to a single preferred embodiment thereof, it will be appreciated that modifications and variations are possible within the scope of the present invention and thus it is not intended to limit the invention to the precise details of illustration or terms of description.

What is claimed is:

1. A storage system for phonograph records comprising
    a support plate adapted to be mounted on a wall or the like,
    a plurality of horizontally disposed support discs with each having an upstanding shaft at the center thereof for receiving and supporting a stack of phonograph records, a plurality of multiple link supports with each including a first support arm pivotally mounted at a first end to said support plate, and a second support arm pivotally connected at one end to a second end of said first arm and extending into connection with an underside of a support disc for mounting said discs to swing toward and outward from said plate, and said support discs and multiple link supports therefor being disposed in vertically spaced relation along said plate, whereby a stack of records may be stored on each disc.

* * * * *